United States Patent [19]

Merriman

[11] 3,848,516

[45] Nov. 19, 1974

[54] HIGH CAPACITY INFLATABLE HOSE FITTING

[76] Inventor: Henry H. Merriman, 751 W. Washington Ave., Jackson, Mich. 49203

[22] Filed: Oct. 2, 1972

[21] Appl. No.: 294,178

[52] U.S. Cl............................ 92/92, 91/418, 285/20, 285/200
[51] Int. Cl............................................... F16j 3/00
[58] Field of Search ........ 92/89, 90, 91, 92; 285/19, 285/20, 150, 200; 417/437, 474, 480, 903

[56] References Cited
UNITED STATES PATENTS

| | | | |
|---|---|---|---|
| 2,991,763 | 7/1961 | Marette | 92/89 X |
| 3,084,961 | 4/1963 | Merriman | 285/242 |
| 3,118,596 | 1/1964 | Saile | 92/92 X |

FOREIGN PATENTS OR APPLICATIONS

| | | | |
|---|---|---|---|
| 457,562 | 6/1949 | Canada | 285/150 |
| 527,327 | 5/1955 | Italy | 92/90 |

*Primary Examiner*—Irwin C. Cohen
*Attorney, Agent, or Firm*—Beaman & Beaman

[57] ABSTRACT

A fitting and valve for an inflatable hose type power unit characterized by its ability to handle large capacities of pressurized medium, versatile operation and use, and economy of manufacture. The fitting includes an internal member having hose mounting means extending from opposite sides thereof whereby the fitting maintains the adjacent hose portions in a flattened condition. A central passage extends through the hose mounting means communicating with a radially extending port open to the interior of the power unit hose. Valve devices are readily insertible into the fitting passage for quickly connecting pressurized medium supply sources to the hose, and valving, as determined by the valve axial position, may serve to pressurize or exhaust the power unit.

8 Claims, 12 Drawing Figures

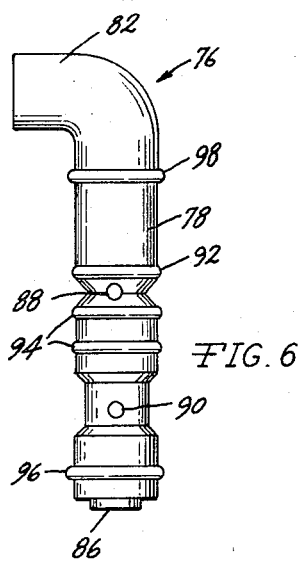
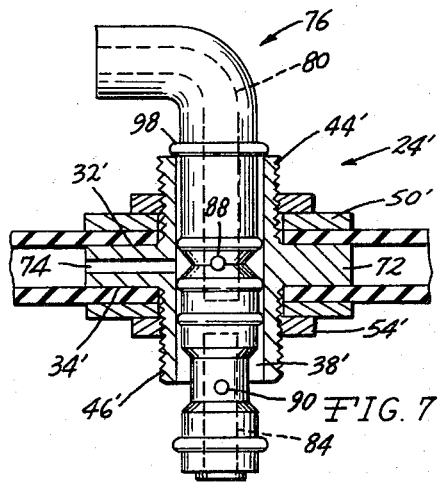
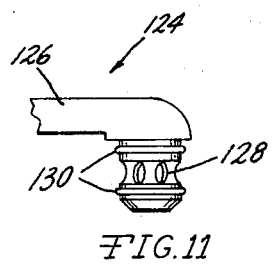
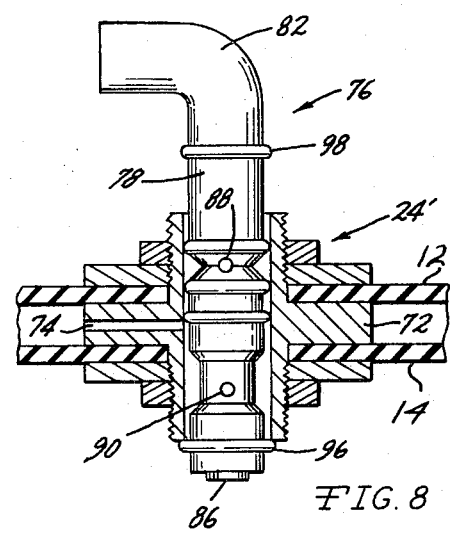
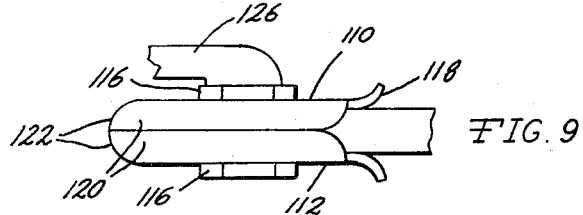
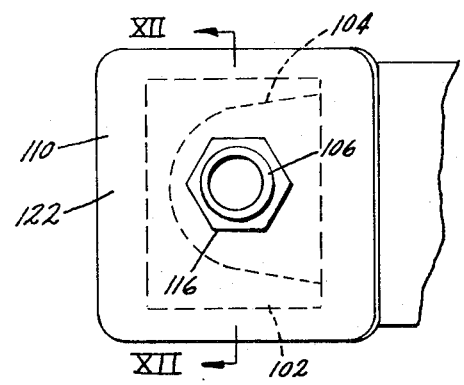
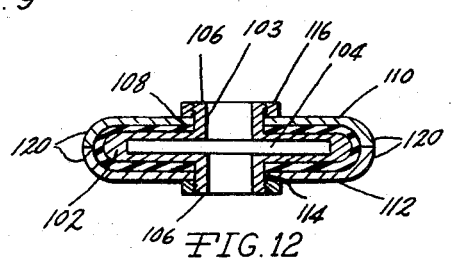

HIGH CAPACITY INFLATABLE HOSE FITTING

BACKGROUND OF THE INVENTION

The invention pertains to the field of fittings for inflatable hose type power units.

Power units utilizing elongated flexible hose wherein the power stroke is produced by the transverse dimensional change of the hose during inflation find advantageous usage in many special applications, and a type of such power unit is shown in my U.S. Pat. No. 3,016,884. Such inflatable hose power units include fittings at the hose end for sealing the ends, and it is common for the hose end fittings to also incorporate port devices wherein the pressurized medium can be introduced into, and removed from, the hose interior. My U.S. Pat. Nos. 2,976,888; 3,084,961 and 3,121,577 illustrate such hose fittings.

As inflatable hose type power units are often of considerable length, such as when used in elongated clamps, and the like, a considerable volume of pressurized air or hydraulic fluid is required to fully inflate the hose, and thus considerable volumes of pressurized medium must be quickly introduced into, and moved from, the hose.

Presently available inflatable hose end fittings are limited in their capacity to handle large volumes of pressurized medium, and often the inflating and deflating action of the power unit is slower than desired, as limited by the ability of the fitting to handle the pressurized and exhausting medium. In the past, the end fitting for the hose was of a relatively flat configuration, in that one of its basic purposes is to maintain the hose in a noninflated flattened condition, and thus the flattened configuration of the end fitting limited the size of the fluid passages therein.

An additional disadvantage of previously available fittings for inflatable hose type power units lies in the fact that known fluid fittings incorporated into the hose end clamps could not be located anywhere except at the hose ends, and in long power units it is advantageous to introduce the pressurized medium at several locations along the hose length remote from the hose ends.

SUMMARY OF THE INVENTION

It is an object of the invention to provide a fitting for inflatable hose power units which is capable of handling high capacities of pressurized medium during either inflation or deflation of the hose. Also, it is an object of the invention to provide a high capacity fitting which is of an economical construction, maintains the hose adjacent the fitting in a flattened condition, and may be utilized with "plug-in" type valve means wherein a pressurized medium supply may be quickly attached to, or removed from, an inflatable hose.

An additional object of the invention is to provide an inflatable hose fitting usable with an axial movable valve wherein the valve may be selectively positioned between inflating and exhaust conditions, eliminating the necessity for the usual four-way valve and more complex valving systems conventionally used with expansible motor devices.

In the practice of the invention the fitting includes an internal member, which may be either of a relatively solid configuration, or may be formed of a pair of flanged members maintained in spaced relationship. Hose connection means extend from opposite sides of the internal member, and are in the form of threaded studs having a passage extending therethrough communicating with the interior of the internal member. Radial ports defined in the internal member communicate with the passage, and a conduit may be directly attached to the studs, or an axially positionable valve may be inserted into the passage for introducing and removing pressurized medium from the hose.

A washer and nut type of connection is used with the threaded studs to firmly attach the fitting to the inflatable hose, and as the internal member is of a generally flat configuration, the fitting will maintain the inflatable hose in a flattened condition adjacent the fitting. As the radial ports defined in the internal member direct the pressurized medium directly into the hose internal chamber the fluid flow path is short and efficient, and especially in the flanged type internal member very high capacity fluid flow may be achieved when a pair of conduits are attached to the fitting.

The "plug-in" type valve which may be used with the fitting may be of a simple nature wherein the valve is merely plugged into the fitting to establish communication therewith. A more complicated valve structure may be utilized wherein a pair of passages are defined in the valve cooperating with axially spaced ports such that the axial position of the valve within the fitting determines which of the two valve passages communicates with the hose interior. Thus, axial positioning of the valve permits valve passages to communicate with the valve chamber, such as for inflation and exhausting purposes.

Another embodiment of the invention illustrates the principles of the fitting used in conjunction with a hose end plate capable of sealing the end of an inflatable hose, and permitting the "plug-in" type valve to be used therewith.

BRIEF DESCRIPTION OF THE DRAWINGS

The aforementioned objects and advantages of the invention will be appreciated from the following description and accompanying drawings wherein:

FIG. 6 is an elevational view of another embodiment of valve which may be used with a fitting in accord with the invention, FIGS. 7 and 8 are elevational, detail, sectional views of an inflatable hose fitting constructed in accord with the invention utilizing a variation of internal member, and used in conjunction with the valve of FIG. 6; FIG. 7 illustrating the hose pressurizing position of the valve, and FIG. 8 illustrating the exhaust position of the valve, FIG. 9 is a side, elevational view of a variation of a fitting in accord with the invention as combined with hose end plates, FIG. 10 is a plan, elevational, detail view of the embodiment of FIG. 9, the valve and valve elbow being omitted for purpose of illustration, FIG. 11 is an elevational, detail view of a valve as used with the embodiment of FIGS. 9 and 10, and FIG. 12 is an elevational, sectional, detail view of the fitting and end plates as taken along Section XII—XII of FIG. 10.

DESCRIPTION OF THE PREFERRED EMBODIMENTS

Figure 1:
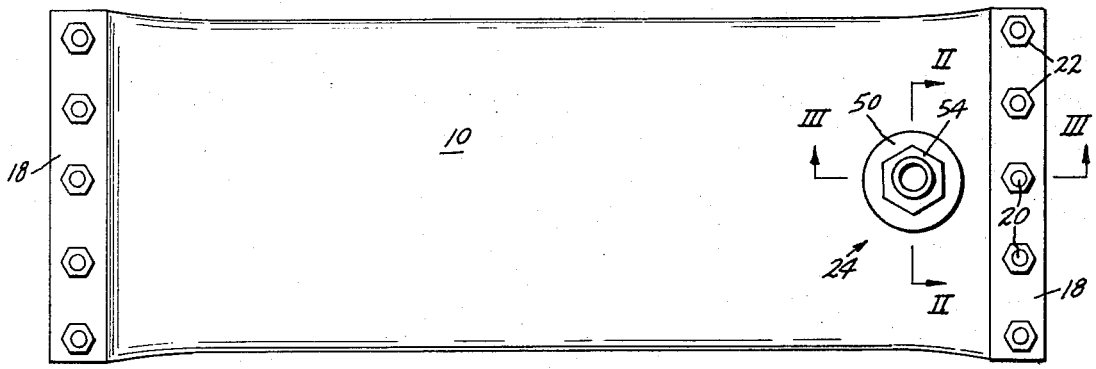
FIG. 1 is a plan view of an inflatable hose and fitting as constructed in accord with the invention.

FIG. 1 illustrates a typical inflatable hose assembly as used with inflatable hose power units. The hose is represented at 10, and is usually formed of reinforced rubber, is relatively flexible, and is often preformed to a normal generally flattened condition wherein the hose includes opposed spaced portions 12 and 14. The hose ends are sealed wherein an enclosed chamber 16 is defined within the hose, and in the illustrated embodiment, the hose ends are sealed by a pair of end plates 18 interconnected by tie bolts 20 extending through holes in the plates and the hose. Tightening of the tie bolt nuts 22 seals the hose ends.

The fitting, generally represented at 24, will normally be mounted adjacent one of the hose ends when the hose is of a relatively short length. In hose of considerable length the fitting may be mounted at the central portion of the hose, if the installation permits, and a plurality of spaced fittings may be used in very long inflatable hose devices.

Figure 2:
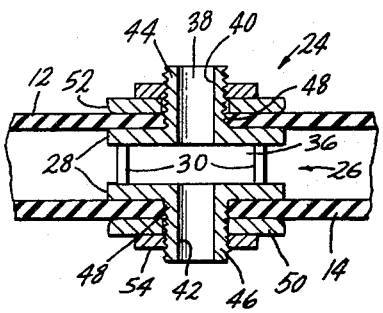
FIG. 2 is an elevational, detail, enlarged, sectional view of a fitting in accord with the invention taken along Section II—II of FIG. 1.
Figure 3:
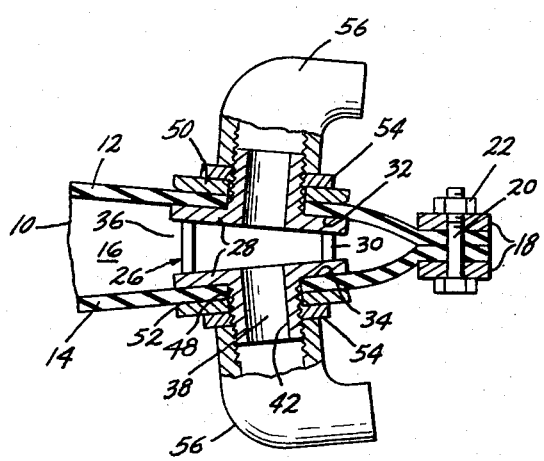
FIG. 3 is an enlarged, elevational, detail, sectional view taken along Section III—III of FIG. 1, illustrating conduit elbows attached to the fitting.

The fitting 24 in accord with the invention includes an internal member 26, which in the embodiment shown in FIGS. 2 and 3, is formed by a pair of flanges 28 maintained in spaced relationship by spacer pins 30 fixed to and extending between the flanges. The internal member 26 is of a generally flat configuration having opposed sides 32 and 34, however, as will be appreciated from FIG. 3, the flanges 28 are obliquely disposed with respect to each other to a limited extent, which is exaggerated in FIG. 3 for purpose of illustration. The reason for the nonparallel relationship of the flanges is to provide an increased space or port opening between the flanges in the direction of the primary portion of the inflatable hose chamber 16. As will be appreciated from FIGS. 1 and 3, the fitting 24 is mounted near the right end of the hose 10, and the greatest space between the flanges 28 exists at the left of the fitting whereby the greatest flow capacity through the fitting is in the direction toward the center of the hose. If a fitting in accord with the invention is to be mounted intermediate the hose ends the flanges 28 will be parallel to each other as it is then desirable that the fluid be ejected from between the flanges in opposite horizontal directions.

The flanges 28 are of a circular peripheral configuration, and the spacing therebetween intermediate the spacers 30 constitute radial ports 36 communicating with the passage 38 defined by the bore 40 and the bore 42 formed in studs 44 and 46 extending from the flanges 28. The studs 44 and 46 are externally threaded, and extend through holes 48, FIGS. 2 and 3, formed in the hose portions 12 and 14. A washer 50 circumscribes each threaded stud and is beveled at 52 to reduce wear due to abrasion of the hose, as the hose inflates and deflates. A nut 54 is threaded upon each stud bearing upon the associated washer 50, whereby tightening of the nut compresses an annular portion of hose material intermediate the associated flange 28 and washer 50.

Assembly of the fitting of the invention to the hose as shown in FIGS. 1 through 3 results in the internal member 26 maintaining a spaced and flattened condition of the hose portions 12 and 14 adjacent the fitting, and as the flanges 28 are rigidly maintained in relationship to each other by the spacers 30, flexing of the hose at the fitting is restrained, and thus wear of the hose material adjacent the fitting is reduced, In FIG. 3 elbows 56 are illustrated as threadedly connected to the studs 44 and 46. The elbows 56 communicate with hose lines, or pipelines, not shown, connecting to the source of a pressurized medium, such as compressed air or hydraulic fluid, and such conduit systems normally include a four-way valve wherein the pressurized medium can be alternately introduced into the fitting and hose, or removed therefrom during exhausting.

As the fitting bores 40 and 42 are in opposed relation, the simultaneous introduction of pressurized medium into the bores causes the medium to meet intermediate the flanges 28, and be forcibly ejected from between the flanges through the ports 36 defined between spacers 30. The slightly oblique relationship of the flanges 28 aids in deflecting the pressurized medium toward the main portion of the hose chamber 16 and the oblique relationship of the flanges producing the increased spacing between the flanges reduces flow restriction. Conversely, when the hose is being exhausted and deflated the pressurized medium easily enters the fitting from between the flanges 28 with little restriction, for exhausting through one or both of the elbows 56, and associated conduit systems.

Figure 4:
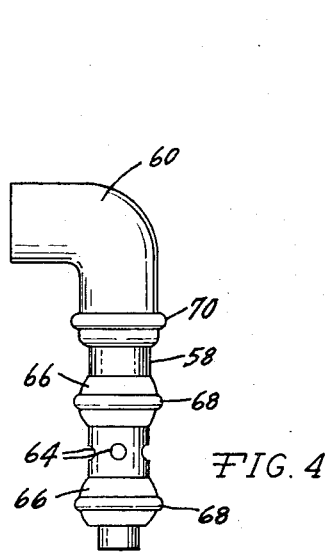
FIG. 4 is an elevational view of a valve that may be used in accord with the invention.
Figure 5:
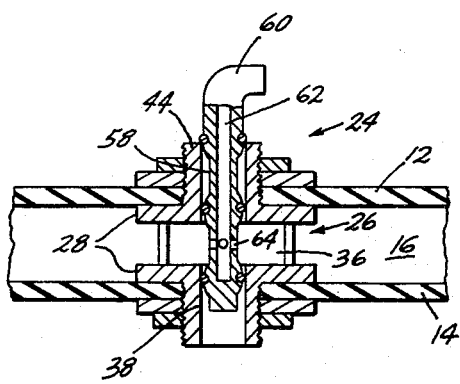
FIG. 5 is an elevational, sectional view illustrating the association of the fitting of FIGS. 2 and 3 with the valve of FIG. 4.

In addition to the increased flow capacity achieved with a fitting as previously described, the construction also permits a "plug-in" type valve member to be used with the fitting, and FIGS. 4 and 5 illustrate a simple type of valve which may be used. The valve includes an elongated body 58 having an elbow portion 60 formed at one end for communication with a hose line or pipe, not shown. As will be noted in FIG. 5, the valve includes a longitudinally extending passage 62, and radial ports 64 communicate with the passage and the exterior of the valve.

Enlarged bulbous valve portions 66 are defined upon the valve, and sealing means, in the form of O-rings 68, are received within annular grooves defined upon the portions 66 for cooperation with the surface of the fitting bores 40 and 42, as will be readily understood from FIG. 5. Upon insertion of the valve into the fitting 24 a third O-ring 70 on body 58 engages the outer end of a stud limiting insertion of the valve into the fitting, and locates the ports 64 in alignment with the ports 36 defined between the flanges 28. Thus, with the valve inserted in the passage 38 as shown in FIG. 5, the interior of the hose is in communication with the valve, and the conduit system associated therewith, and the hose may be inflated and exhausted therethrough.

The "plug-in" type valve shown in FIGS. 4 and 5 is fully usable with the fitting of FIGS. 1 through 3, even though the bores 40 and 42 are slightly out of alignment due to the oblique relationship of flanges 28. However, the construction of the valve using portions 66 permits the valve to accommodate itself to the oblique relationship of the bores, and the O-rings 68 will provide a sealing connection in both bores 40 and 42.

Connection of the valve body 58 to the fitting 24 merely involves inserting the valve into the passage 38 until the O-ring 70 engages the adjacent stud. Likewise, the valve is removed from the fitting merely by pulling the same from the bores. Thus, a conduit system may be very quickly attached to inflatable hose power units utilizing a fitting 24 in accord with the invention, and the construction of the fitting and valve produces a balanced condition such that the existence of pressure within the hose does not tend to "blow out" the valve from the fitting.

In FIGS. 7 and 8 a fitting 24' is illustrated utilizing the same inventive concepts as the fitting shown in FIGS. 1 through 3, and primed reference numerals are used for like components, however, the internal member 72 is formed of a solid member, rather than being formed of flanges maintained in spaced relationship. The internal member 72 is of the desired thickness for maintaining the hose portions 12 and 14 in the desired spaced relationship, and includes a plurality of radially extending ports 74 communicating with the internal passage 38'. Threaded studs 44' and 46' extend from the opposite sides 32' and 34' of the internal member 72, and washers 50' and nuts 54' cooperate with the threaded studs in exactly the same manner as described with respect to the previous embodiment. While the embodiment of FIGS. 7 and 8 does not have the "open" port of the arrangement of FIGS. 2 and 3, by using a plurality of radial ports 74 the fitting of FIGS. 7 and 8 is capable of handling large capacities of pressurized medium with little restriction to flow.

A modified valve 76 for use with either of the fitting embodiments shown in FIGS. 1 through 3, or FIGS. 7 and 8, is shown in FIG. 6. In this valve embodiment the elongated valve body 78 includes a first elongated passage 80 communicating with the elbow 82 connected to the pressurized supply source, and a second coaxial passage 84 intersects the free end 86 of the valve, but does not communicate with the first passage 80. Radial ports 88 communicate with the supply passage 80, while radial ports 90 communicate with the exhaust passage 84. As will be appreciated from the drawings, the valve is reduced in diameter at the ports 88 and 90 wherein annular flow paths and clearance is provided adjacent the ports.

A plurality of sealing rings are mounted within annular recesses defined on the valve body 78. A first sealing ring 92 forms the seal between the ports 88 and the elbow 82. Second sealing rings 94 seal the ports 88 from the ports 90, and it will be appreciated that the pair of sealing rings 94 could be replaced by a single sealing ring. The third sealing ring 96 seals the port 90 with respect to the valve end 86. Sealing ring 98 is used as a stop to limit insertion of the valve body 78 into the fitting passage, FIG. 7, while sealing ring 96 serves as a stop to limit withdrawal of the valve from the fitting passage 38', FIG. 8.

When the valve 76 is axially positioned within the fitting 24' as shown in FIG. 7, the ports 88 are in alignment and communication with the internal member ports 74 wherein pressurized fluid may be supplied to the chamber of the inflatable hose. Upon withdrawing the valve 76 from the fitting passage so that the sealing ring 96 engages the end 86, as in FIG. 8, the ports 88 are now out of alignment with the radial ports 74, and are sealed with respect to the passage 38'. However, the ports 90 are now in communication with the ports 74, and the pressurized medium within the inflatable hose may be exhausted through the ports 74 and 90, and through the exhaust passage 84, and into the atmosphere. Thus, the "two position" valve 76 of FIGS. 6 through 8, permits an economically producible valve to be used with an inflatable hose type power unit, and this valve eliminates the necessity for expensive four-way valves, or the complicated valve systems often used with expansible motors.

FIGS. 9 through 11 disclose a variation in a fitting using the concept of the invention wherein end plates for sealing the hose ends are combined with the fitting. With reference to FIG. 12, the internal member 102 consists of a plate having a slot 104 cut into the plate edge and having passage 103 extending therethrough. The threaded studs 106 extend through holes 108 defined in the hose adjacent the hose end. A pair of plates 110 and 112, designated as end plates, each include a hole 114 whereby a plate may be inserted over a threaded stud 106, and held in place by a nut 116.

The end plates 110 and 112 each include a turned up edge 118 disposed toward the length of the hose, whereby the edge 118 produces a curved surface minimizing abrasion between the end plates and hose during hose inflation. Also, the end plates are flanged at their lateral and end edges 120 and 122, respectively, whereby the end plate edges may abut each other when the nuts 116 are tightened to their fullest extent, and the hose is compressed to its fullest extent between member 102 and plates 110 and 112.

It will therefore be appreciated that upon tightening of the nuts 116 whereby the hose end is sandwiched between the end plates and the internal member a sealed relationship of the hose end occurs, and a combined fitting and end plate construction results.

FIG. 11 illustrates an additional type of valve which may be used with the fitting of FIG. 12, as shown in position in FIG. 9. The valve 124 includes an internal passage, not shown, communicating with the conduit 126. Radial ports 128 intersect the internal passage for alignment with the slot 104 when the valve is in position, in the manner similar to that shown in FIGS. 5 and 7. Sealing is produced by the sealing O-rings 130 disposed upon opposite sides of the ports 128. Thus, upon insertion of the valve 124 into the fitting passage 103 communication with the hose is established, and the valve 124 merely need be removed from the fitting for maintenance or connection of the valve to another power unit.

It will be appreciated that other modifications may be apparent to those skilled in the art without departing from the spirit and scope of the invention.

I claim:

1. In an inflatable hose power unit, a hose having opposed, spaced flattened portions and ends, means closing the ends of said hose, a hole defined in each portion, said holes being in opposed relation, a fitting having a generally flat internal member having a periphery and opposite sides, hose mounting means defined on each side of said internal member for attaching said internal member to the opposed hose portions, said internal member being located within said hose intermediate said portions and said hose mounting means extending through said holes, an exteriorly accessible passage defined in said internal member, and port means open to the interior of said hose and communicating with said passage and said internal member periphery.

2. In an inflatable hose power unit as in claim 1 wherein said hose mounting means comprises a threaded stud extending from each internal member side, and nut means threadedly mounted upon each stud.

3. In an inflatable hose power unit as in claim 2 wherein said passage longitudinally extends through at least one of said studs.

4. In an inflatable hose power unit as in claim 3 wherein said passage longitudinally extends through said stud defined on each side of said internal member.

5. In an inflatable hose power unit as in claim 1 wherein said internal member is formed by a pair of members each having a flange, and a plurality of spacers interposed between the flanges of said members maintaining said flanges in spaced relationship defining said port means therebetween.

6. In an inflatable hose power unit as in claim 1 wherein said port means comprise a plurality of bores radially defined in said internal member having an inner end intersecting said passage and an outer end intersecting said internal member periphery.

7. In an inflatable hose power unit as in claim 5 wherein said flanges are substantially planar and the planes of said flanges are obliquely disposed to each other.

8. In an inflatable hose power unit as in claim 2 wherein said hose mounting means includes a plate mounted on each stud disposed upon the hose exterior surface, a nut threaded on each stud, said plate being of a width substantially equal to the flattened width of the inflated hose and extending over a hose end.

* * * * *